INVENTORS
WALTER HIRSCH &
WILBER D. WEBER

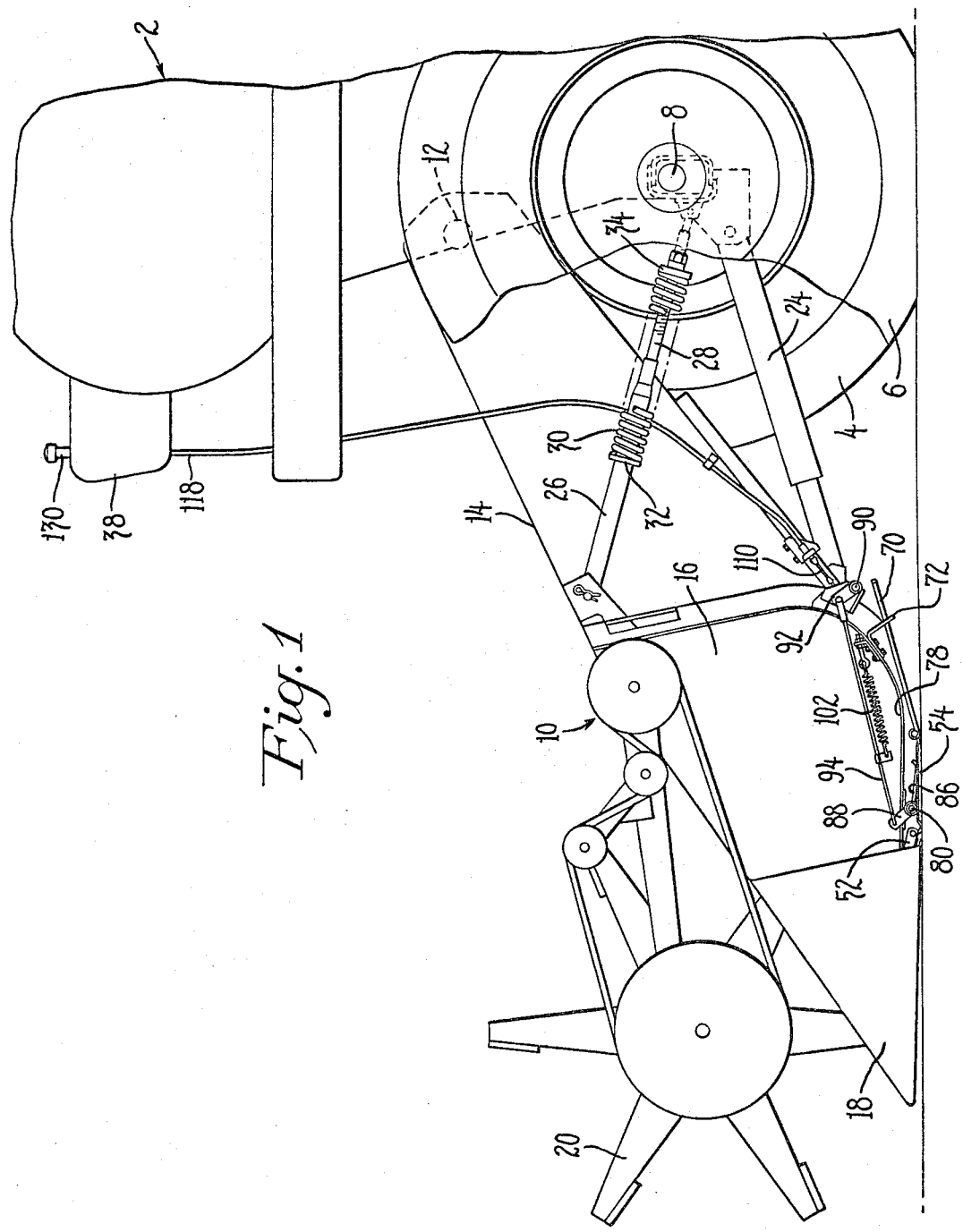

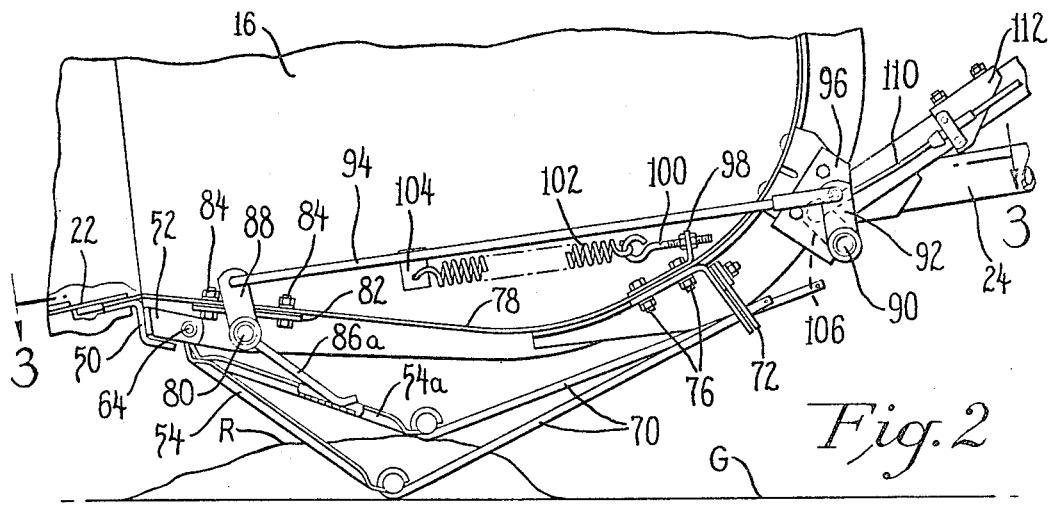
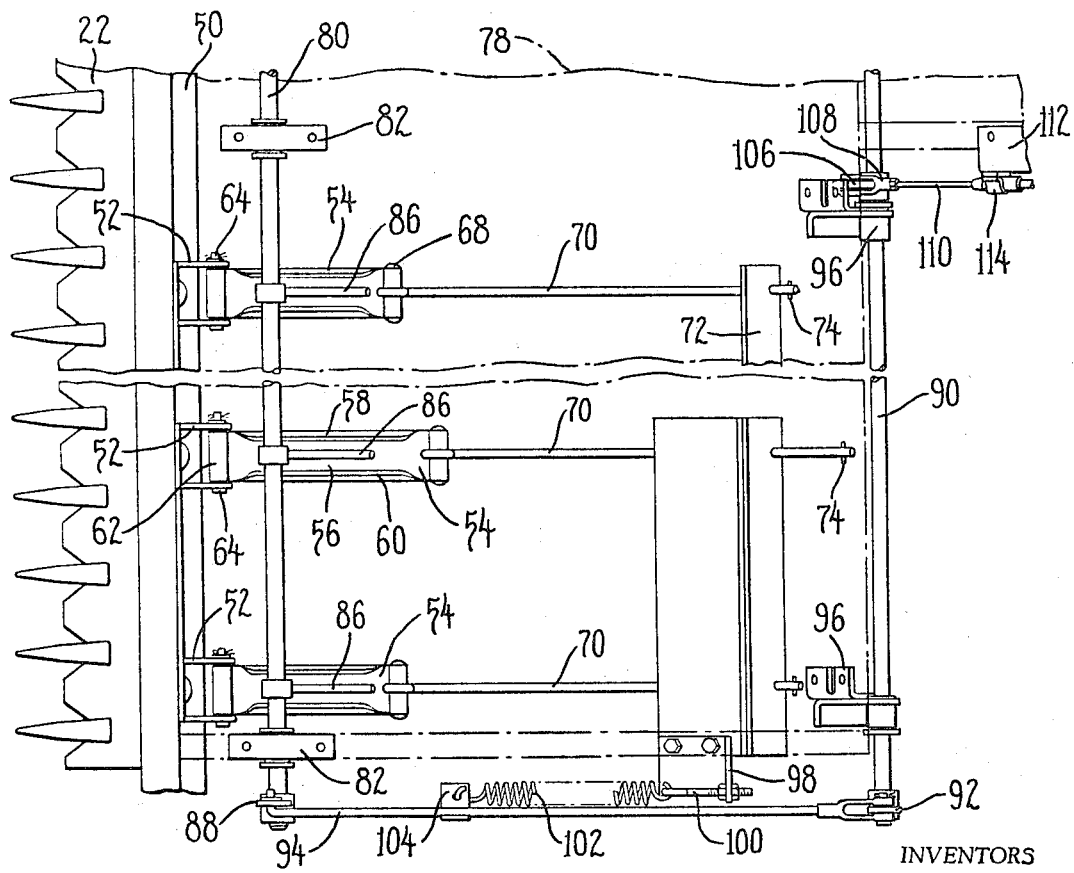

Tweedale & Gerhardt
ATTORNEYS

United States Patent Office 3,383,845
Patented May 21, 1968

3,383,845
AUTOMATIC HEIGHT CONTROL FOR
COMBINE HEADER
Walter Hirsch, Don Mills, Ontario, and Wilbert D. Weber, Nashville, Ontario, Canada, assignors to Massey-Ferguson Industries Limited, Toronto, Ontario, Canada
Filed July 22, 1965, Ser. No. 473,925
7 Claims. (Cl. 56—208)

This invention relates generally to self-propelled agricultural machines, and is particularly concerned with an arrangement for automatically controlling the minimum operating height of a harvesting header on such a machine above the ground.

In harvesting low lying crops, such as soy beans and other feed crops, as well as for harvesting grains which have been beaten down, or cotton, the cutting head of the combine must be maintained as close to the ground as possible in order to completely harvest the crop. At the same time, the header must be maintained at a minimum position above the ground to avoid running the cutter into the ground and picking up stones and the like. It is difficult, if not impossible, for the operator to properly gauge the correct height for the header, and it is therefore necessary to provide means for automatically raising and lowering the header in accordance with changes in the contour of the ground.

In accordance with the present invention, a plurality of feeler members are mounted beneath the header along a transverse axis for pivotal movement individually with respect to the header. Rotatably mounted beneath the header in rearwardly spaced, parallel relationship with the axis of the feeler members is an actuating rod having a plurality of fixed, radially extending actuating fingers projecting into engagement with the feeler members. The actuating rod is in turn connected through a linkage and cable system with the hydraulic control unit for the header ram such that rotation of the actuating rod operates the control unit to raise and lower the header. The actuating rod is biased such that the actuating fingers tend to urge any feeler member in contact therewith downward towards the ground. When any one of the feeler members is caused to pivot upwardly by a rise in the ground, the actuating rod is rotated to actuate the hydraulic control unit and cause the header to be raised in accordance with the position of the highest feeler member.

The objects, advantages and features of the invention will become apparent from the following description taken in connection with the accompanying drawings in which:

FIG. 1 is a partial elevational view of a combine having an automatic header height control embodying the invention;

FIG. 2 is an enlarged, fragmentary elevational view of the header and automatic controls;

FIG. 3 is a partial sectional view taken on line 3—3 of FIG. 2;

Figure 4:
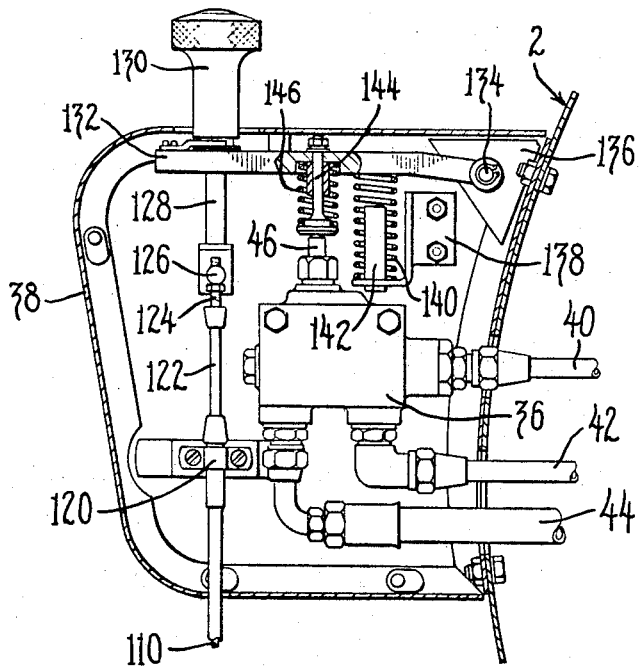
FIG. 4 is a sectional view of the automatic control unit.

While the invention will be described in connection with a preferred embodiment, it will be apparent to those skilled in the art that other forms may be adopted without departing from the scope and spirit of the invention.

Referring to FIG. 1, reference numeral 2 designates the main body of a combine harvester having front wheels 4 and 6 mounted on an axle 8. Supported on the forward end of the main body is a header designated generally by reference numeral 10. Header 10 is supported for vertical pivotal movement about the axis of a shaft 12, and includes the usual elevator 14, table 16 and reel 20. Table 16 is provided with forwardly projecting shields 18 disposed at the ends of a cutter bar 22 (FIG. 3). Header 10 is raised and lowered about the axis or shaft 12 by a hydraulic ram 24 which is extendable and retractable to respectively raise and lower the header. Telescoping rods 26 and 28 are connected respectively with header 10 and the main body near axle 8. Mounted on the telescoping rods 26 and 28 is a compression spring 30 having its ends seated on spring support members 32 and 34 fixed respectively to rods 26 and 28. Spring 30 assists the hydraulic ram 24 in supporting the header 10 and permits a lower hydraulic pressure to be used in the ram 24 and a more precise adjustment of that pressure.

The flow of hydraulic fluid to and from ram 24 is regulated by a hydraulic control unit 36 (FIG. 4) connected with a pump or other source of hydraulic fluid under pressure through a pressure or input line 40. Control unit 36 is enclosed in a housing 38 supported on the main body 2 of the combine. The flow from pressure line 40 is directed either to a return line 42 or an output line 44 by a metering plunger 46 slidably mounted in control unit 36. The output line 44 is connected with the hydraulic ram and directs fluid to and from the ram in accordance with the position of plunger 46. When the control unit 36 is set for automatic operation, fluid flows continuously from line 40 into the control unit, and metering plunger 46 controls the flow from line 40 to the drain or return line 42. When the operating plunger 46 is pushed downwardly from the position shown in FIG. 4, flow to the drain line 42 from pressure line 40 is restricted allowing a build up of fluid pressure in the output line 44 and the ram to raise the header. Conversely, when the metering plunger 46 moves upwardly, the fluid flows from line 40 to return line 42 is increased allowing the pressure in output line 44 to drop and permitting lowering of the header by its own weight.

Figure 5:
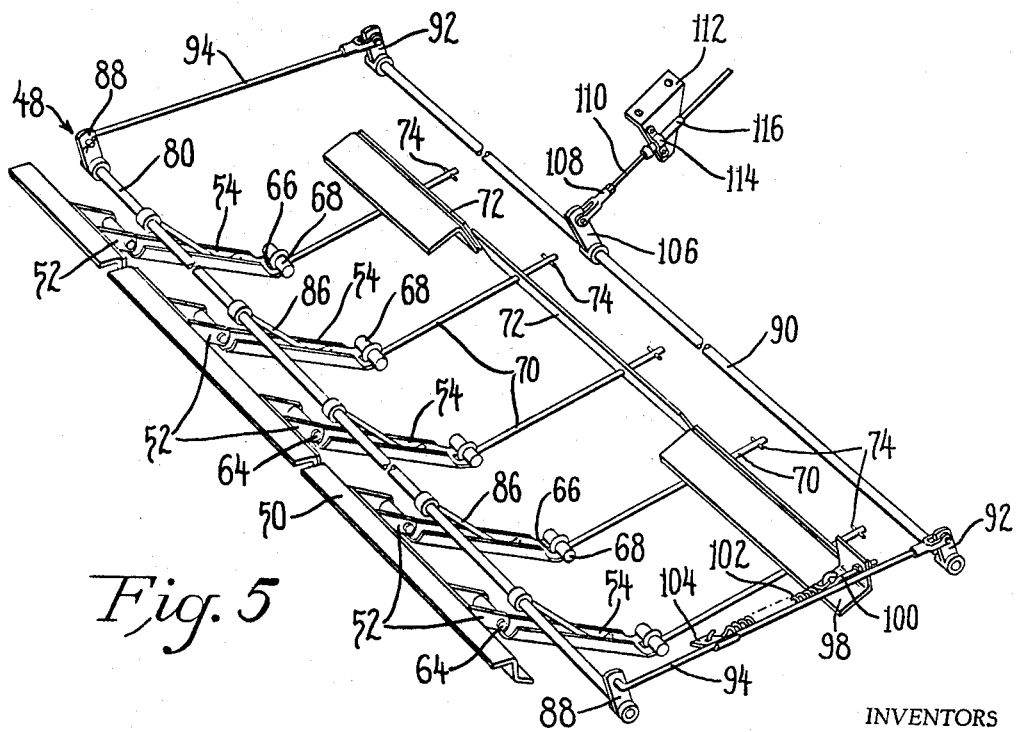
FIG. 5 is a perspective view of the automatic control unit of the invention.

The metering plunger 46 of control unit 36 is actuated in accordance with the height of the header above the ground as determined by automatic control mechanism designated generally by reference numeral 48 in FIG. 5. Referring to FIGS. 2, 3 and 5, the automatic control mechanism 48 includes a support bar 50 mounted beneath the header adjacent cutter bar 22 and extending transversely to the direction of travel of the combine. Projecting rearwardly from support bar 50 is a plurality of support brackets 52 made up of spaced pairs of apertured ears. Mounted on each of support brackets 52 is a sensing or feeler member 54, and as shown in FIGS. 3 and 5, feelers 54 are substantially evenly spaced along the length of support bar 50. In the illustrated embodiment, the feeler members 54 each include a base portion 56 (FIG. 3) having upstanding side flanges 58 and 60 with the forward end of the base portion 56 curved to define a hinge portion 62 receiving a pivot pin 64 mounted in the support brackets 52. Consequently, each of the feeler members is independently pivotal about the axis of pins 64, which axis is transverse to the longitudinal axis of the combine.

The rear end of the base portion 56 of the feeler members 54 is formed with a longitudinal slot 66 (FIG. 5), and a transverse stub shaft or pin 68 is welded or otherwise secured to the base portion adjacent slot 66. Slot 66 receives the curved end of a guide rod 70 which extends around pin 68 to pivotally connect the forward end of the guide rod with the rear end of the opposed feeler member. Each guide rod 70 is slidably received in the depending leg of a guide bar 72 secured beneath table 16 by bolts 76 (FIG. 2). Guide bar 72 is spaced rearwardly of support bar 50 and in parallel relationship therewith. Each of the guide rods 70 is provided with a transverse stop pin 74 at its rear end for limiting the forward sliding movement of the guide rod in guide bar 72. The feeler members 54 are each independently pivotal about the axis of their associated pivot pins 64, and their downward and forward pivotal movement, as viewed in FIG. 2, is limited by stop pins 74 on the guide rod 70 pivotally connected in trailing relationship with each feeler member. Consequently, when the movement of the combine is reversed, i.e. toward the right as viewed in FIG. 2, the feeler members 54 will not be damaged by over-travel in a clockwise direction about pins 64.

Secured to the wall 78 of table 16 by bolts 84 is a plurality of bearing brackets 82 for rotatably supporting an actuating rod 80 in parallel relationship with support bar 50. Actuating rod 80 is mounted beneath the header slightly to the rear of the support bar 50. Mounted on actuating rod 80 along the length thereof is a plurality of actuating fingers 86, one for each feeler member 54, which are fixed to the actuating rod 80 and extend radially therefrom in parallel relationship with each other. Thus, movement of any one of the actuating fingers 86 causes rotation of actuating rod 80 within the bearing brackets 82, and all of the actuating fingers 86 move simultaneously. Mounted on the opposite ends of actuating rod 80 is a radially projecting lever 88.

Rotatably mounted in bearing brackets 96 secured to the wall 78 of the table is an operating shaft 90 which is disposed in parallel relationship with members 50, 80 and 72, and which is located to the rear of guide bar 72 in the illustrated embodiment. Fixed to the opposite ends of the operating shaft 90 are operating levers 92 which project radially from the operating shaft, and which are connected with the actuating levers 88 by links 94. As a result, rotation of the actuating rod 80 is transmitted through actuating levers 88 and links 94 to levers 92 to cause corresponding rotation of operating shaft 90.

Secured to the upper side of wall 78 is a support bracket 98 having an upstanding flange in which is mounted in an eye bolt 100 which supports one end of a spring 102, the other end of which is supported in a bracket 104 secured to link 94 intermediate its ends. Spring 102 acts through link 94 to bias the actuating rod 80 in a clockwise direction as viewed in FIG. 2 in such a manner that each of the actuating fingers 86 engages one of the feeler members 54. The actuating fingers 86 thus in turn urge the feeler members 54 downwardly or a clockwise direction about their pivot pins 64 toward engagement with the ground as shown in FIG. 2. As a result, upward or counterclockwise movement of any one of feeler members 54 about its pivot pin 64 will cause rotation of actuating rod 80 which in turn will be transmitted to operating rod 90 through levers 88 and 92 and in link 94.

Fixed to the mid portion of operating shaft 90 is a lever 106 to which is pivotally connected a bifurcated terminal fitting 108 on the end of a control cable 110. Cable 110 is slidably supported by a clamp 114 to a support bracket 112 mounted beneath the elevator housing of the header. Cable 110 extends through an opening in the housing 38 where it is slidably supported by a clamp 120. The terminal 122 of cable 110 has a threaded end portion 124 which is adjustably received in an internally threaded fitting 126 secured to the lower end of a rod 128. Rod 128 in turn is adjustably received in a knob 130 mounted on the upper side of a control lever 132. Rotation of adjustment knob 130 causes vertical movement of rod 128 to increase or decrease the tension on cable 110.

Control lever 132 is pivotally mounted on a pin 134 supported on a bracket 136 within housing 38. Secured to the housing beneath control lever 132 is a bracket 138 for a spring 140 concentrically enclosing a stop pin 142. Spring 140 resiliently supports lever 132 for rotation about pivot point 134. Mounted on control lever 132 between spring 140 and the outer, free end of the lever is an actuating member 144 which is slidable in the control lever and is biased by a spring 146 into engagement with the metering plunger 46 of the hydraulic control unit 36. Downward, counter-clockwise pivotal movement of control lever 132 will thus exert a downward force on plunger 146 causing more hydraulic fluid to be directed through the output conduit 44 to the hydraulic ram to raise the header. Conversely, upward movement of control lever 132 permits plunger 46 to move upwardly and drain off some of the fluid from the output conduit 44 permitting the header to move downwardly about the axis of shaft 12.

In operation, adjustment knob 130 is rotated to set the metering plunger 46 in a neutral position to maintain a predetermined height above the ground and maintain a constant tension on cable 110. Cable 110 acts through lever 106, operating shaft 90, levers 92 and links 94 to cause the actuating fingers 86 to urge the feeler members into engagement with the ground.

With reference to FIG. 2, with the combine moving forwardly (toward the left in FIG. 2), the feeler members 54 engage the surface of the ground G. When one of the feelers designated 54a in FIG. 2 encounters a rise or projection R, the projection forces it to pivot upwardly about its pin 64, and acting through the actuating finger 86a causes rotation of actuating rod 80 against the force of spring 102. Rotation of actuating rod 80 from the neutral position is transmitted through lever 88, link 94 and lever 92 to operating shaft 90 which, acting through lever 106 pulls cable 110 downwardly as viewed in FIG. 4. Downward movement of cable 110 causes downward, counterclockwise movement of control lever 132 about pivot 134 to exert a downward force on metering plunger 46 thus increasing the flow of hydraulic fluid to ram 24 causing it to raise the header. As the header raises, the feeler member 54a is caused to swing downwardly about its pivot point 64 by spring 102, and return control lever 132 to its neutral position as the header reaches its selected height above the top of the ridge R. Conversely, when the ground falls away from the feeler members 54, spring 102 will cause the feelers to pivot clockwise or downwardly about pins 64 and relieve the tension load on cable 110 and cause control lever 132 to move upwardly due to the biasing force of springs 140 and 146. This upward movement reduces the force on operating plunger 46 causing an increase in the fluid flow to return conduit 42 and permit the ram 24 to contract and lower the header to the new position, but still maintaining the header at a minimum height above the ground as determined by the highest feeler member 54.

With the actuating fingers 86 received on top of the feeler members 54, the actuating fingers are protected from the ground, and reverse movement of the combine will not damage the feeler members or actuating fingers. The provision of the support spring 30 on the telescoping rods 26 and 28 assists the ram in lifting the header and permits more precise adjustment of the ram.

While a specific arrangement has been illustrated and described in the foregoing specification and accompanying drawings, it will be apparent to those skilled in the art that various equivalents and alterations in the construction and arrangement of parts can be made without departing from the scope and spirit of the invention as set forth in the appended claims.

We claim:

1. In an agricultural combine having a main body with a header mounted on the forward end thereof for vertical movement and power means for raising and lowering the header relative to the ground, automatic control means for operating said power means in accordance with the contour of the ground comprising: a support bar carried beneath the header adjacent the forward end thereof and extending transversely of the longitudinal axis of the combine; a plurality of elongated feeler members each having one end pivotally mounted on said support bar, said feeler members being substantially evenly spaced along the length of said support bar; a guide bar mounted beneath the header rearwardly of the support bar in parallel relationship therewith and projecting downwardly and rearwardly from beneath the header; a plurality of guide rods, equal in number to the feeler members, slidably supported in said guide bar and spaced along the length of the guide bar such that each guide rod is aligned with one of the feeler members; stop means on the rear ends of the guide rods for limiting the forward travel of the guide rods in the guide bars; means pivotally connecting the forward ends of the guide rods with the rear ends of the opposed feeler members with the length of the feeler members and guide rods such that the feeler members project downwardly and rearwardly beneath the header and the guide rods project downwardly and forwardly in trailing relationship with the feeler members whereby upward movement of the feeler members about their pivotal axis causes rearward sliding movement of the guide rods in the guide bar; an actuating rod rotatably mounted beneath the header between the support bar and guide bar in parallel relationship therewith; a plurality of actuating fingers equal in number to the feeler members projecting radially from the actuating rod in parallel relationship with each other and spaced substantially evenly along the length of the actuating rod such that each actuating finger is engageable with one of the feeler members; means interconnecting said actuating rod with said power means for actuating the power means to raise and lower the header upon rotation of the actuating rod; and means biasing the actuating rod to a position such that each of the actuating fingers engages one of the feeler members and urges the feeler member downwardly toward the ground; said feeler members being individually operable upon pivotal movement about said support bar to rotate said actuating rod and actuate the power means to raise and lower the header in accordance with the ground contour as determined by the position of the higher of the feeler members.

2. An agricultural combine having a main body, a header mounted on the main body for pivotal movement about a horizontal axis; a hydraulic ram mounted between the main body and header extensible and retractable to respectively raise and lower the header relative to the ground; a hydraulic control unit connected with said hydraulic ram for selectively extending and retracting said ram; spring means mounted between said header and said main body for biasing the header in an upward direction about its horizontal pivotal axis to assist the hydraulic ram in supporting the header; a plurality of feeler members each pivotally mounted beneath the header adjacent to the forward end thereof on an axis transverse to the direction of travel of the header; means limiting the pivotal movement of each of said feeler members such that when the feeler members are held out of engagement with the ground, they project downwardly and rearwardly beneath the header and are individually pivotal upwardly and rearwardly about said transverse axis; a transverse actuating rod rotatably mounted beneath said header in spaced, parallel relationship with the transverse pivotal axis of said feeler members; a plurality of actuating fingers equal in number to said feeler members fixed at one end to said actuating rod and extending radially therefrom in parallel relationship with each other; means biasing said actuating fingers downwardly such that each actuating finger engages a feeler member; and means interconnecting said actuating rod with said hydraulic control unit for actuating the hydraulic control unit in response to rotation of said actuating rod caused by upward pivotal movement of any one of said feeler members to raise and lower the header in accordance with changes in the contour of the ground as determined by the higher of said feeler members.

3. In an agricultural combine having a main body with a header mounted on the forward end thereof for vertical movement and power means for raising and lowering the header relative to the ground, automatic control means for operating said power means in accordance with the changes in the contour of the ground to maintain the header at a selected minimum height above the ground comprising: means defining a transverse pivotal axis beneath the header adjacent the forward end thereof; a plurality of transversely spaced elongated feeler members mounted on said last mentioned means for independent pivotal movement on said transverse axis; a guide means connected with said feeler members for limiting the downward pivotal movement of the feeler members relative to the header; an actuating rod rotatably mounted beneath the header in spaced, parallel relationship with said transverse axis; a plurality of actuating fingers equal in number to the feeler members projecting radially from the actuating rod in parallel relationship with each other and spaced such that each actuating finger is engageable with one of the feeler members; means interconnecting said actuating rod with said power means for actuating the power means to raise and lower the header upon rotation of the actuating rod; and means biasing the actuating rod to a position such that each of the actuating fingers engages one of the feeler members and urges the feeler member downwardly toward the ground; said feeler members being individually pivotal about said transverse axis to rotate said actuating rod and actuate the power means to raise and lower the header in accordance with changes in the ground contour.

4. A height control for an agricultural machine having a harvesting header operated by power means, and means for controlling the power means for raising and lowering the header to maintain the same at a constant height above the ground, a height sensing assembly including a plurality of ground engaging feeler members, said feeler members being independently pivoted on the header for up and down movement about a common axis transverse to the direction of travel of the machine, a motion transmitting shaft spaced front and parallel to the axis of said feeler members, a plurality of force transmitting members fixed to said shaft and arranged above and in the path of said feeler members so as to be contacted and moved by the highest feeler member, and linkage means connecting said shaft with said controlling means to cause said header to be raised and lowered to maintain the same at a predetermined height above the ground engaging point of said highest feeler member.

5. The height control of claim 4 when said linkage is adjustable in length to vary said predetermined height.

6. The height control of claim 4 wherein said power means includes a hydraulic pressure system and said control means includes valve means connected to said linkage.

7. The height control of claim 4 wherein said feeler fingers each comprise a pair of longitudinally extending portions pivotally connected together at one end, the forward one of said portions connected at its forward end to said header on said common axis and the rearward of said portions supported by said header for forward and rearward sliding movement, and means for limiting the forward amount of said sliding of said rearward portion.

References Cited

UNITED STATES PATENTS

| | | | |
|---|---|---|---|
| 2,750,727 | 6/1956 | Wright | 56—208 |
| 3,088,264 | 5/1963 | Sallee | 56—210 |
| 3,163,974 | 1/1965 | Mack | 56—214 |

ANTONIO F. GUIDA, *Primary Examiner.*

RUSSELL R. KINSEY, *Examiner.*